US00RE34351E

United States Patent [19]

Lacey

[11] E Patent Number: Re. 34,351

[45] Reissued Date of Patent: Aug. 24, 1993

[54] REMOTELY DETACHABLE ANIMAL LEASH

[76] Inventor: Leslie Lacey, 24314 Port Gamble Rd., Poulsbo, Wash. 98370

[21] Appl. No.: 795,975

[22] Filed: Nov. 22, 1991

Related U.S. Patent Documents

Reissue of:

[64] Patent No.: 4,903,638
Issued: Feb. 27, 1990
Appl. No.: 271,507
Filed: Nov. 15, 1988

[51] Int. Cl.[5] ..... A01K 27/00; A44B 13/02

[52] U.S. Cl. ..... 119/779; 24/601.5

[58] Field of Search ..... 119/106, 109, 114; 24/601.5, 598.4, 600.2

[56] References Cited

U.S. PATENT DOCUMENTS

| | | | |
|---|---|---|---|
| 701,268 | 5/1902 | Howard et al. | 119/114 |
| 932,238 | 8/1909 | Balentine | 119/114 |
| 3,910,234 | 10/1975 | Heuson | 119/114 |
| 4,404,927 | 9/1983 | Woutat | 119/114 |

FOREIGN PATENT DOCUMENTS

| | | | |
|---|---|---|---|
| 23828 | 4/1906 | Switzerland | 119/114 |
| 88996 | 4/1921 | Switzerland | 119/114 |

*Primary Examiner*—John G. Weiss
*Attorney, Agent, or Firm*—Harry M. Cross, Jr.

[57] ABSTRACT

The jaws of the catch on a leash are latched by a yieldably biased sleeve, which is retractable by a pull cord extending rearwardly to the handle of the leash.

7 Claims, 3 Drawing Sheets

FIG. 4
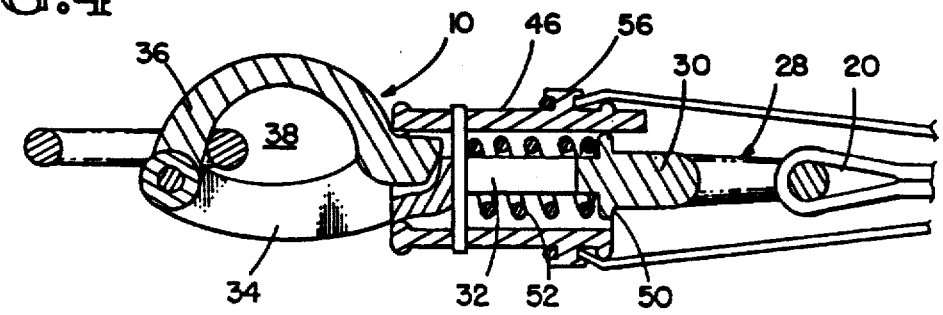
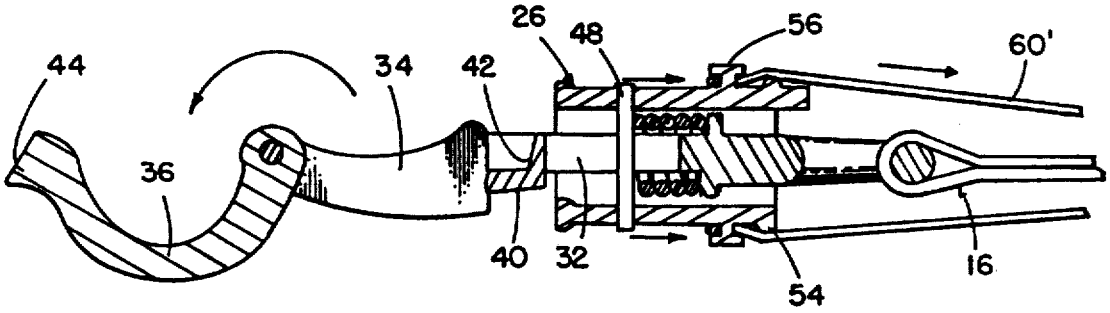
FIG. 5

REMOTELY DETACHABLE ANIMAL LEASH

Matter enclosed in heavy brackets [ ] appears in the original patent but forms no part of this reissue specification; matter printed in italics indicates the additions made by reissue.

FIELD OF THE INVENTION

This invention relates to a leash for an animal, and in particular, to one which is remotely detachable from the animal, such as from the collar of a dog, by means disposed at the hand of the user.

BACKGROUND OF THE INVENTION

Dogs are used by security officers when they act in an official capacity as such, as well as by men and women who, though not acting in an official capacity, nevertheless take a walk or otherwise venture from their homes only in the company of a dog on a leash. In each case, there may be occasion to release the dog from the leash so that he can track or pursue a suspect, or fend off an attacker without the constraint of the leash. For this reason, various leashes have been developed which are equipped with a quick release catch mechanism on the distal end thereof, so that the leash can be quickly detached from the dog's collar when the user wishes to release the dog for any of these purposes. However, in each instance, it is necessary to reach out to the dog, or draw the dog up to a point of proximity where the catch mechanism can be grasped for this purpose. And when the user is under attack, or a security officer is desirous of releasing the dog for the capture of a suspect, time is of the essence and even this brief step can consume valuable time needed in the process.

SUMMARY OF THE INVENTION

As indicated, the present invention relates to an animal leash which is remotely detachable from the collar of the animal at the hand of the user. According to the invention, the leash comprises an elongated, flexible tether having releasable collar engaging catch means adjacent one end thereof, and a hand grip adjacent the other end thereof. The catch means include a pair of relatively reciprocable jaws which are openable to a position in which they enable the catch means to be engaged about an attachment point on the collar, and closeable when the catch means are so engaged, to a position in which they enable the tether to be secured to the collar of the animal. The leash also comprises latch means which are mounted on the tether to reciprocate between a position in which they engage with the catch means to lock the jaws in the closed position thereof, and a position in which they disengage from the catch means to unlock the jaws for reciprocation to the open position thereof. In addition, the leash is equipped with manual release means for the latch means, including a hand actuator which is disposed on the tether adjacent the hand grip thereof, and interconnected with the latch means to reciprocate the latch means between the jaw-locking position and the jaw-unlocking position thereof.

In many of the presently preferred embodiments of the invention, the latch means are yieldably biased to assume the jaw-locking position thereof, and the latch release means are operable to reciprocate the latch means against the bias thereon. For example, in certain presently preferred embodiments of the invention, the jaws are relatively reciprocable in the direction relatively toward the hand grip to close, and the latch means include a retainer element which is yieldably biased in the direction relatively away from the hand grip to engage the jaws in the closed position thereof. In some embodiments, the jaws are pivotally interconnected with one another at the distal end of the tether and openable to a position wherein they are disposed in tandem with one another axially of the tether, and closeable to a position wherein they are disposed abreast of one another relatively rearward of the pivotal connection therebetween; and in such a case, the retainer element has a recess in the relatively forward end thereof within which the jaws are received when engaged by the element in the closed position thereof.

In one particular group of embodiments, the retainer element takes the form of a sleeve which is reciprocably mounted on a rigid tenon at the distal end of the tether, and yieldably biased relatively toward the distal end of the tenon by a coiled spring which is caged in the sleeve; and in such a case, the latch release means further include an elongated cord which interconnects the actuator with the sleeve to reciprocate the same against the bias of the spring when the jaws are to be unlocked for reciprocation to the open position thereof.

Preferably, the body of the tether is hollow, and the cord extends through the body of the same. Also, the tether preferably has an eye formed on the aforesaid other end portion thereof, to serve as a handle for grasping the tether, and the cord opens into the eye of the handle and has an eye on the same within the eye of the handle, so that a user grasping the handle can insert one finger in the eye of the cord and use it as a trigger to retract the cord and reciprocate the sleeve against the bias of the spring when the jaws are to be unlocked for reciprocation to the open position thereof.

These features will be better understood by reference to the accompanying drawings wherein one of the presently preferred embodiments of the invention is illustrated in connection with tethering a dog by such a leash.

BRIEF DESCRIPTION OF THE DRAWINGS

FIG. 4 is a part cross-sectional view of the catch mechanism on the leash;

FIG. 5 is another such view of the catch mechanism in the open condition thereof;

DETAILED DESCRIPTION OF THE INVENTION

Figure 1:
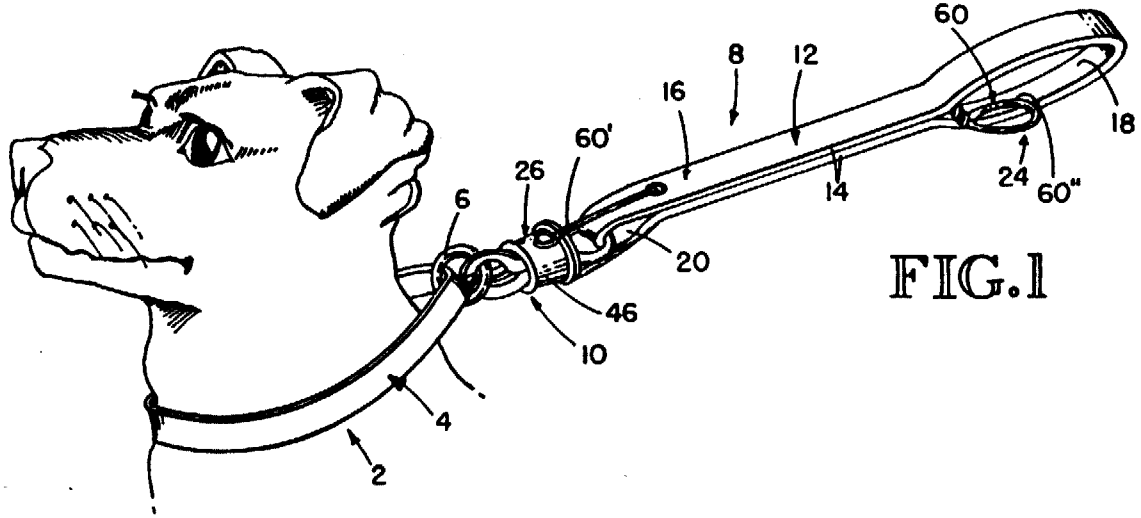
FIG. 1 is a perspective view of the leash when it is attached to a collar on the dog.
Figure 2:
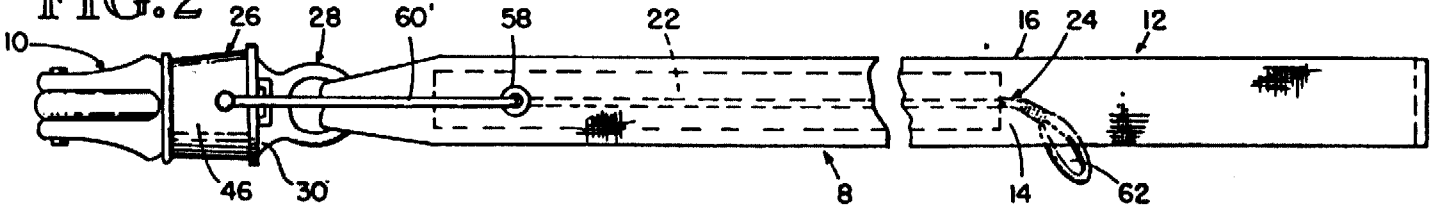
FIG. 2 is a part-phantom plan view of the leash.
Figure 3:
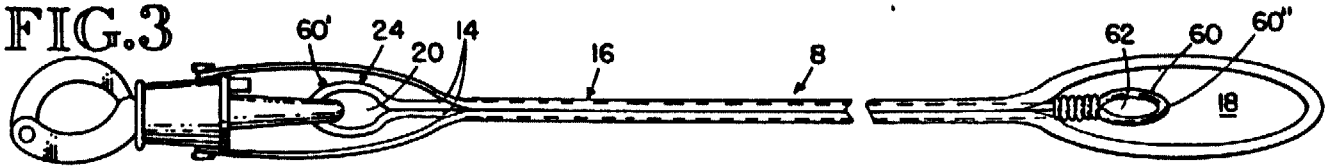
FIG. 3 is a part-phantom side-elevational view of the leash.

Referring to the drawings, it will be seen that the dog 2 is equipped with a collar 4 having an attachment ring 6 thereon to which the leash 8 is attached by the catch mechanism 10 of the same. The leash 8 itself is composed of an elongated strip 12 of leather or other flexible material, and in this instance, the strip 12 is folded reentrantly at each end so that portions of it can be overlapped in opposing sections 14 which are then sewn together at their edges to form a hollow strap 16 having eyes 18 and 20 at its ends. The larger, 18 of the eyes, at the right-hand end of the strap 16, serves as a handle-like grip for the same, and the smaller, 20, of the eyes, at the left-hand end of the strap, serves as an attachment point for the catch mechanism 10, as shall be explained. In addition, the hollow 22 between the two sections serves as a passage for a manual release means 24 to the latch means 26 of the catch mechanism 10, as shall also be explained.

The catch mechanism 10 comprises a buckle-like attachment ring 28 to which the left-hand eye 20 of the strap 16 is attached. The ring 28 is flat, but has a wide-spreading head 30 at the forward end thereof, from which a pair of tenons 32 project still more forwardly of the ring. The tenons 32 are spaced apart and parallel to one another, and are interconnected at their forward ends by a yoke-like jaw 34 which extends still further forward and has a reentrant jaw 36 pivotally interconnected between the relatively outlying ends thereof. The bodies of the respective jaws 34 and 36 are outwardly bowed about their axis so as to form an eye 38 between them when the relatively articulated jaw 36 is superposed on the relatively fixed jaw 34, as in FIG. 4. In addition, the bight 40 of the fixed jaw 34 has a saddle-like abutment 42 recessed therein, and the articulated jaw 36 has an upturned toe 44 on the relatively rearward end thereof which seats in the saddle of the abutment 42 when the articulated jaw 36 is superposed on the fixed jaw 34, as in FIG. 4.

The jaws 34 and 36 are openable to the condition of FIG. 5 to enable the catch mechanism 10 to be engaged about the attachment ring 6 of the collar 4, and then closeable when they are so engaged, to enable the strap 16 to be secured to the collar 4 as a tether for the dog. However, in the latter condition, the jaws 34, 36 must be locked against relative reciprocation, and the latch means 26 are provided for this purpose. They comprise a sleeve 46 which is circumposed about the pair of tenons 32 and oblong in cross-section so as to closely enclose the same. The sleeve 46 is equipped with a bulkhead 48 across the forward end portion thereof, and the bulkhead is slideably engaged on the tenons to reciprocate between a position in which the sleeve engages about the jaws of the catch mechanism to lock the jaws against reciprocation in the closed position thereof, and a position in which it disengages from the jaws to unlock the jaws for reciprocation to the open position thereof. To coordinate the motion of the sleeve, the head 30 of the attachment ring 28 of the catch mechanism is equipped with an oblong flange 50, and a pair of coiled springs 52 is caged between the flange 50 and the bulkhead 48, about the tenons, to bias the sleeve 46 into the jaw-locking position thereof. In this position, the sleeve envelopes the toe 44 and abutment 42 of the jaws and serves as a latch for the jaws. The sleeve 46 is retractable against the bias of the springs 52, however, to unlock the jaws for reciprocation to the open position thereof, seen in FIG. 5.

This is accomplished by the manual release means 24 within the strap 16. The sleeve 46 has a raised rib 54 about the relatively rearward end portion thereof, and a pair of button-like lugs 56 on the outer periphery thereof at opposing sides of the same. There is a pair of grommetted holes 58 in the corresponding sides of the strap, and a cord 60 is folded into opposing halves 60' which are passed through the hollow 22 of the strap, out the holes 58, over the ribs 54, and then secured at their ends to the respective lugs 56 on the sleeve 46. In addition, the two halves 60' of the cord are spliced together, just ahead of the bight 60'' in the same, to form an eye 62 within the eye of the handle 18 of the strap. In this way, a user grasping the handle 18 can insert one finger into the eye 62 of the cord and use it as a trigger to reciprocate the sleeve 46 against the bias of the springs 52 when the jaws 34 and 36 are to be unlocked for reciprocation to the open position thereof. Accordingly, when the user wishes to release the dog 2 from the leash 8, he can do so quickly without the necessity for taking time to draw the dog to him, or to reach forward to a point where he can directly detach the catch mechanism 10 from its collar.

Figure 6:
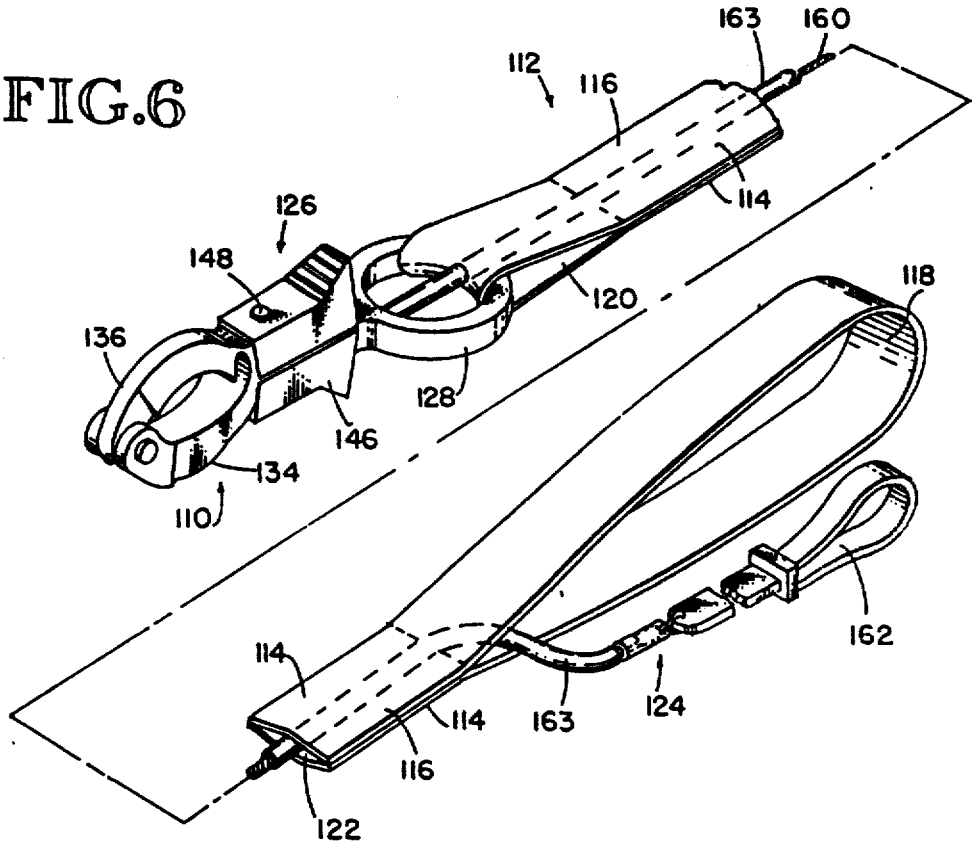
FIG. 6 is a perspective view of an improved leash having superior handling characteristics to the FIGS. 1–5 embodiments.
Figure 7:
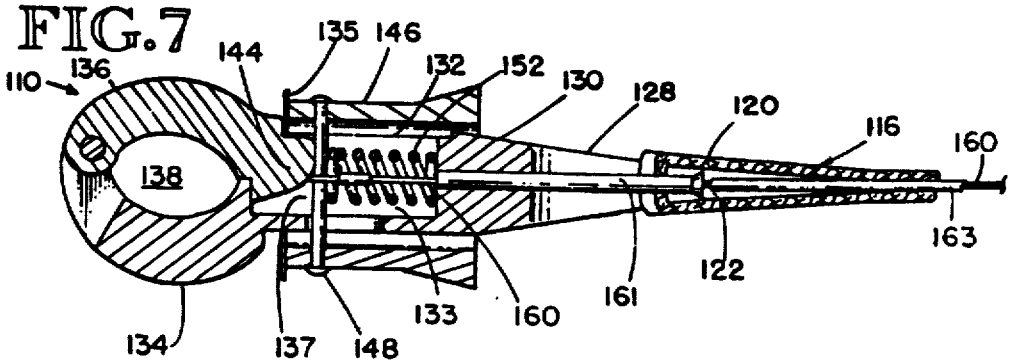
FIG. 7 is a cross-section view of the FIG. 6 improved leash.

In FIGS. 6 and 7, an improved remotely detachable restraint is illustrated. This improved design enables the restraint to be unlocked to release an animal without having to maintain tension on the restraint, as by pulling against the animal. Similar elements are designated by numerals 100 units higher that similarly-numbered elements of the embodiment shown in FIGS. 1–5.

The latch means 126 comprises a single tenon 132 extending outward from the head 130 of ring 128, with fixed jaw section 134 extending outwardly of the tenon 132, and with articulated jaw section 136 pivotally connected to the distal end of fixed jaw section 134. The ring 130, tenon 132 and fixed jaw 134 are preferably formed as a unitary structure, as by a metal casting process. The tenon 132 and ring head 130 are cylindrical with the tenon being provided with an axial, elongated, interior cavity 133 which carries a spring 152, shown as a coiled compression spring. The outer end of the tenon 132, from which the fixed jaw section 134 commences, is provided with an annular rim 135. The junction of fixed jaw section 134 with tenon 132 is slotted at 137 to receive the toe 144 of articulated jaw section 136, when the latter is pivoted into its closed position.

The release means of catch mechanism 110 also comprises a release sleeve 146 that encloses tenon 132 and is slideable, fore and aft, along the tenon between the tenon rim 135 and the base of ring 128. A pin bulkhead 148, such as a metal rivet, is fastened to the sleeve and extends laterally through the tenon 132 and tenon cavity 133. A slot is provided in at least one side of the outer wall of the tenon 132, the opposite wall thereof being preferably nonexistent inasmuch as the tenon cavity 133 is open to the inner surface of the sleeve 146. The bulkhead pin 148 will ride in that slot as the sleeve 146 is shifted back and forth along the tenon 132. The spring 152 is confined between the bulkhead pin 148 and the inner end of the tenon cavity 133, adjacent the ring head 130.

The cord 160 of manual release means 124 is fastened to the mid-section of the bulkhead pin 148, and extends therefrom through the tenon cavity 133 and within the spring 152, axially through ring head 130 and through the ring rim itself, into the longitudinal passage, or hollow, 122 in the strap 116. The cord 160 extends through the strap 116. The cord, itself, is preferably comprised of a woven wire cable encased in a smooth sheath of plastic or other suitable material, and is of the type used in aircraft control cables. The cable cord is looped around the bulkhead pin 148 and secured to itself with a crimped fastener. The mid-portion of the bulkhead pin 148 may be provided with an annular groove to help center the cable cord where it is fastened thereto. A metal tubing 161 is inserted through the ring 128 and extends from the ring rim, through the ring eye and axially into the ring head 130. The cable cord extends through the tubing 161 and is laterally confined therein, the tubing inner diameter being only slightly greater than the outer diameter of the cable cord. The opening into the ring rim is countersunk to provide a relieved surface to minimize wear on the cable cord as it extends from the ring into the loop 120 of strap 116. The strap loop 120 is provided with an opening through which the metal tubing 161 extends as it crosses the ring eye. This arrangement serves to position the strap relative to the ring 128 and also provides a means whereby the cable cord is not exposed to external surroundings. The cable cord is enclosed by a sheath 163, in the form of a close-fitting plastic tubing, that extends from the ring passage countersink inlet to the handle end of the cord. The cable cord extends out from the sheath at the handle end only a short distance and is then attached to a cord handle or trigger 162 that, in turn, extends into the eye of the strap handle 118.

The cord sheath 163 is essentially confined within the strap 116. If the strap is held in any position at any one point along its length, and the cord handle 162 is pulled, the sleeve 146 will be shifted toward the strap and the toe 144 of the articulated jaw 136 will be released so that the articulated jaw can pivot into an open position. This opening can occur even though the strap itself is not under tension, as by being pulled against an animal, if the strap is supported at one location along its length. Such support could simply be provided by resting the strap, at some point between its loops 116, 118 in the hand of a person holding the leash.

The manual release means 124 may be provided as a loop of plastic or other flexible material, the free, inner end of which is attached to the terminus of the cord 160. The free end of the release strip 124 may be secured to the cord by looping the cord end through a hole provided therefore in the strip 124 and the cord fastened to itself by a crimped fastener. Ths codr sheath 163 would terminate adjacent the crimped terminus of the cord. The release strip 124 may be provided as an adjustable loop so that the size of the loop can be expanded or contracted as required or desired by the user.

While the preferred embodiment of the invention has been described herein, variations in the design may be made. The scope of the invention, therefore, is only to be limited by the claims appended hereto.

The embodiments of the invention in which an exclusive property is claimed are defined as follows:

I claim:

1. A [leash for an animal collar] *remotely-detachable restraint*, comprising: an elongated, flexible tether having releaseable [collar] attachable catch means adjacent one end thereof, and a hand grip adjacent the other end thereof;

the catch means including a pair of relatively reciprocable jaws which are openable to a position in which the jaws enable the catch means to be released from an attachment point [on the collar], and closeable about an attachment point [on the collar], when the catch means are so engaged, to a position in which the jaws enable the tether to be secured to the [collar] *attachment point*, and further including a buckle-like structure defining a tether-attaching element to which said ether is connected;

latch means reciprocably mounted by said catch means and moveable relative to said jaws from a position where said jaws are locked into an engaged condition to a position where said jaws are unlocked into a disengaged condition;

manual release means for the latch means, including a hand-operated actuator which is disposed on the tether adjacent the hand grip thereof, and a elongated release cord extending longitudinally through said tether and interconnecting the latch means and the hand-operated actuator to reciprocate the latch means between the jaw-locking position and the jaw-unlocking position thereof, said cord extending through the structure of said tether-attaching element to a point of attachment with said latch means, and a cord-confining sheath abutting and extending from the catch means tether-attaching element through the tether to said hand-operated actuator, said cord extending through said sheath from its point of departure from said tether-attaching element structure to said hand-operated actuator.

2. The [leash] *restraint* according to claim 1 wherein the jaws are relatively reciprocable in the direction relatively toward the hand grip to close, and the latch means including a latching element yieldably biased in the direction relatively away from the hand grip to engage the jaws in the closed position thereof.

3. The [leash] *restraint* according to claim 2 wherein the jaws are pivotally interconnected with one another at the distal end of the tether and openable to a position wherein they are disposed in tandem with one another axially of the tether, and closeable to a position wherein they are disposed abreast of one another from the pivotal connection therebetween toward said tether, and wherein said latching element receives and engages the jaws when placed in the closed position thereof.

4. The [leash] *restraint* according to claim 2 wherein the catch means includes a rigid tenon extending from said tether-attaching element, having one of said jaws being extended from said tenon; and wherein said latching element takes the form of a sleeve which is reciprocably mounted on said tenon at the distal end of the tether and yieldably biased relatively toward the distal end of the tenon by a coiled spring caged within the sleeve.

5. The [leash] *restraint* according to claim 4 wherein the tether has an eye formed on the aforesaid other end portion thereof to serve as a handle for grasping the tether, and the cord opens into the eye of the handle and has an eye on the same within the eye of the handle so that a user grasping the handle can insert one finger in the eye of the cord to enable him to pull the cord and reciprocate the sleeve against the bias of the spring when the jaws are to be unlocked for reciprocation to the open position thereof.

6. The [leash] *restraint* according to claim 4 wherein the tether-attaching element includes a tether ring connected to said tenon by a ring head, and includes a cord-confining tubing extended through said ring and ring head to provide a shielded cord passageway from the interior of said tenon to the interior of said tether, and further includes a cord fastening element extended from said sleeve into the tenon interior whereby said cord is fastened to said cord fastening element within said tenon for shifting said sleeve from a locked to and unlocked position upon pulling said actuator.

7. The [leash] *restraint* according to claim 4 wherein the tether-attaching element includes a tether ring connected to said tenon by a ring head, with said tether being looped around said ring and fastened back on itself, and includes a cord-confining tubing extended through said ring and ring head to provide a shielded cord passageway from the interior of said tenon to the interior of said tether, and further includes a cord fastening element extended from said sleeve into the tenon interior whereby said cord is fastened to said cord fastening element within said tenon for shifting said sleeve from a locked to an unlocked position upon pulling said actuator.

* * * * *